(12) United States Patent
Zhang et al.

(10) Patent No.: US 9,939,671 B2
(45) Date of Patent: Apr. 10, 2018

(54) LIQUID CRYSTAL MODULE DETECTION APPARATUS FOR DETECTING IMAGE-STICKING, AND DETECTION AND EVALUATION SYSTEM AND METHOD

(71) Applicant: BOE Technology Group Co., Ltd., Beijing (CN)

(72) Inventors: Peilin Zhang, Beijing (CN); Jaegeon You, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 222 days.

(21) Appl. No.: 13/995,481

(22) PCT Filed: Dec. 17, 2012

(86) PCT No.: PCT/CN2012/086800
§ 371 (c)(1),
(2) Date: Jun. 18, 2013

(87) PCT Pub. No.: WO2013/174131
PCT Pub. Date: Nov. 28, 2013

(65) Prior Publication Data
US 2014/0085571 A1 Mar. 27, 2014

(30) Foreign Application Priority Data
May 25, 2012 (CN) .......................... 2012 1 0168213

(51) Int. Cl.
G02F 1/1333 (2006.01)
G09G 3/00 (2006.01)

(52) U.S. Cl.
CPC ....... *G02F 1/133382* (2013.01); *G09G 3/006* (2013.01); *G09G 2320/0257* (2013.01)

(58) Field of Classification Search
CPC ..................................................... G09G 3/006
See application file for complete search history.

(56) References Cited

U.S. PATENT DOCUMENTS 5,516,028 A * 5/1996 Rasp .................. H05K 13/0061
209/573
5,772,300 A * 6/1998 Kitai ...................... G03B 21/16
349/161

(Continued)

FOREIGN PATENT DOCUMENTS

CN 101126878 A 2/2008
CN 201616230 * 10/2010 ............... G09F 9/35

(Continued)

OTHER PUBLICATIONS

Second Office Action (Chinese language) issued by the State Intellectual Property Office ("SIPO") on Sep. 28, 2014 for international application No. 201210168213.6, 8 pages.

(Continued)

*Primary Examiner* — Edward Glick
*Assistant Examiner* — Anthony G Quash
(74) *Attorney, Agent, or Firm* — Ladas & Parry LLP

(57) ABSTRACT

Disclosed is a liquid crystal module detection apparatus for detecting image-sticking, and a detection and evaluation system and method. The apparatus comprises: a sealed thermal-insulating transparent container (1), adapted to contain a liquid crystal module (5) to be tested; a temperature-control module, adapted to adjust the temperature inside the container; a signal generator module (4), adapted to provide a drive signal to the liquid crystal module to be tested. The apparatus employs a sealed, well thermal-insulating, transparent container, and utilizes the heat emitted from the panel and the backlight of the module itself to form a desired temperature environment for detection.

15 Claims, 1 Drawing Sheet

(56) References Cited

U.S. PATENT DOCUMENTS

| | | | |
|---|---|---|---|
| 6,710,762 B1* | 3/2004 | Hasegawa | 345/101 |
| 8,842,253 B2* | 9/2014 | Kim et al. | 349/161 |
| 2002/0097395 A1* | 7/2002 | Smith et al. | 356/239.2 |
| 2003/0193347 A1* | 10/2003 | Ito et al. | 324/770 |
| 2007/0081344 A1* | 4/2007 | Cappaert | G02B 6/0085 362/373 |
| 2008/0043189 A1 | 2/2008 | Sasaki et al. | |
| 2009/0096778 A1* | 4/2009 | Su et al. | 345/214 |
| 2009/0213304 A1* | 8/2009 | Dunn | H05K 7/20972 349/96 |
| 2013/0027068 A1* | 1/2013 | Li et al. | 324/750.03 |
| 2014/0085571 A1 | 3/2014 | Zhang et al. | |

FOREIGN PATENT DOCUMENTS

| | | | |
|---|---|---|---|
| CN | 201616230 U | 10/2010 | |
| CN | 102103835 A | 6/2011 | |
| CN | 102682683 A | 9/2012 | |
| CN | 102736282 | * 10/2012 | G02F 1/13 |
| JP | 07253765 A | 10/1995 | |

OTHER PUBLICATIONS

English translation of second Office Action, listed above, 11 pages.
First Office Action for Chinese application 201210168213.6 (Chinese language) issued by the State Intellectual Property Office, dated Mar. 13, 2014, 7 pages.
English translation of the First Office Action for CN201210168213.6, listed above, 7 pages.
PCT International Search Report (Chinese language) issued by the International Searching Authority for CN2012086800, dated May 25, 2012, 12 pages.
English translation of CN102103835 (A), listed above, 14 pages.
English translation of CN201616230 (U), listed above, 6 pages.
English translation of CN101126878 (A), listed above, 26 pages.
English translation of JP07253765 (A), listed above, 20 pages.
English translation of CN102682683 (A), listed above, 12 pages.

* cited by examiner

LIQUID CRYSTAL MODULE DETECTION APPARATUS FOR DETECTING IMAGE-STICKING, AND DETECTION AND EVALUATION SYSTEM AND METHOD

CROSS REFERENCE TO RELATED APPLICATIONS

This application is based on International Application No. PCT/CN2012/086800 filed on Dec. 17, 2012, which claims priority to Chinese National Application No. 201210168213.6, filed on May 25, 2012, the contents of which are incorporated herein by reference.

TECHNICAL FIELD

Embodiments of the present invention relate to a liquid crystal module detection apparatus for detecting image-sticking, and a detection and evaluation system and method.

BACKGROUND

Thin film transistor liquid crystal displays (TFT-LCDs) have features of small size, low power consumption and no radiation, and have been widely applied in production and life of customers, for example, in TVs, monitors, as well as portable electronic display products. Major display panel manufacturers are all in their efforts to improve product performances, for example, to reduce power consumption, increase viewing angles, and reduce response time. Improvement on image-sticking is particularly important for a display panel, because presence of image-sticking directly affects display quality of a displayed image.

Image-sticking refers to the phenomenon that, when a liquid crystal panel is switched to a new image after a specific static image which has been displayed (driven) for a long time period, a faint outline of the previously displayed image partly remains visible on the screen of the liquid crystal panel. Image-sticking is the phenomenon that occurs inside a liquid crystal cell. When a liquid crystal panel is switched to display a different new image after long-time display of a static image, the liquid crystal molecules cannot deflect immediately and completely to meet the new image, thus the display effect is disadvantageously affected.

Based on different forms of occurrence, image-sticking can be classified into two types: area image-sticking and line image-sticking.

Image-sticking mechanism studies show that, image-sticking occurs mainly because of the influence by residual electric charges, which include different distributions of ionic impurities inside a liquid crystal cell and the polarization electric charges incurred inside the liquid crystal cell under the action of an external electric field. These residual electric charges will affect the orientations of the liquid crystal at the top and the bottom of the liquid crystal cell, so that image-sticking occurs in the entire panel area, and more severe situation occurs at transitional positions where significant color difference exists between images. Occurrence of image-sticking is also affected by other factors, such as ambient temperature, static picture type, display duration, brightness level, etc.

Typically, after a liquid crystal module is completed by assembling, it is necessary to detect it on several aspects such as picture quality, dusts, foreign bodies, etc., in order to improve quality and yield for liquid crystal modules. Among others, the detection includes detection and evaluation of image-sticking. The liquid crystal module detection environment requires a certain temperature. A traditional image-sticking evaluation system generally consists of two main parts: one is a signal generator; and the other is an external heating and temperature control equipment. Because a heating and temperature-control equipment needs an external high capacity power supply and a complicated temperature control device, the traditional image-sticking detection system thus is usually bulky, of high cost, and inconvenient for moving due to its large volume. This result that the traditional system requires a dedicated evaluation field, and therefore it cannot perform convenient, real-time evaluation, and it is disadvantageous for monitoring image-sticking level at any time.

SUMMARY

Embodiments of the present invention are intended to provide a small-volume, easy-to-carry, liquid crystal module detection apparatus for detecting image-sticking, and a detection and evaluation system and method.

One aspect of the present invention provides a liquid crystal module detection apparatus for detecting image-sticking, comprising: a sealed thermal-insulating transparent container, adapted to contain a liquid crystal module to be tested; a temperature-control module, adapted to adjust the temperature inside the container; and a signal generator module, adapted to provide a drive signal to the liquid crystal module to be tested.

As for the liquid crystal module detection apparatus, for example, the temperature-control module may comprise: a temperature-control unit and a temperature-adjustment unit; the temperature-control unit is adapted to sense the temperature inside the container, and turn on/off the temperature-adjustment unit according to the sensed temperature; and the temperature-adjustment unit is connected with the temperature-control unit and adapted to adjust the temperature inside the container.

As for the liquid crystal module detection apparatus, for example, the temperature-control unit may be integrated within the container.

As for the liquid crystal module detection apparatus, for example, the temperature-adjustment unit may be integrated within the container.

As for the liquid crystal module detection apparatus, for example, the signal generator module may be integrated within the container.

As for the liquid crystal module detection apparatus, for example, the temperature-control unit may comprise: a temperature sensor and a controller; the temperature sensor is adapted to sense the temperature inside the container, and transmit the sensed temperature data to the controller; the controller turns on/off the temperature-adjustment unit according to the temperature data.

As for the liquid crystal module detection apparatus, for example, the signal generator module may be a programmable logic controller.

As for the liquid crystal module detection apparatus, for example, the controller and the signal generator module may belong to the same one programmable logic controller.

Another aspect the present invention further provides a liquid crystal module detection and evaluation system for detecting image-sticking, and the system comprises any apparatus as described above.

Yet another aspect of the present invention further provides a liquid crystal module detection and evaluation method for detecting image-sticking, and the method comprises steps as follows:

S1. placing a liquid crystal module to be tested inside a sealed thermal-insulating transparent container;

S2. providing drive signals to the liquid crystal module to be tested, so that the liquid crystal module to be tested works to display; and S3. sensing the temperature inside the container, and if the sensed temperature does not reach a temperature reference range for detection, then waiting; if the sensed temperature exceeds the temperature reference range for detection, then adjusting the temperature inside the container, until the sensed temperature is within the temperature reference range for detection, and then starting the detection on the liquid crystal module to be tested.

The apparatus, system and method provided by the embodiments of the present invention, employ a sealed, well thermal-insulating transparent container customized for a liquid crystal module to be tested, and utilize the heat emitted from the display panel and the backlight of the module itself to form a desired temperature environment for detection, thus reduce the volume of the apparatus and costs; besides, the signal generator module and the temperature-control module are integrated within the container, the volume of the apparatus can be further reduced for easy carry, and thus to facilitate real-time monitoring of the liquid crystal module detection and evaluation.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, technical or scientific terms used herein should be interpreted in the usual sense as understood by those ordinary skilled in the relevant art of the present invention. The wordings "a", "an", "the" and the like, herein do not denote a limitation of quantity, but denote the presence of at least one of the referenced item. The terms "connection" or "interconnection" or the like, are not limited to physical or mechanical connections, but may comprise electrical connection, whether direct or indirect.

Usually only about 5% of the light emitted from the backlight of a liquid crystal module can pass through its panel and ultimately works for display, while the rest energy is mostly converted into heat and dissipated. An embodiment of the present invention utilizes the heat emitted from the panel and the backlight of the liquid crystal module itself to provide a desired temperature environment for detection, thus avoids the volume increase caused by adding a heating and temperature control equipment and meanwhile reduces costs.

Figure 1:
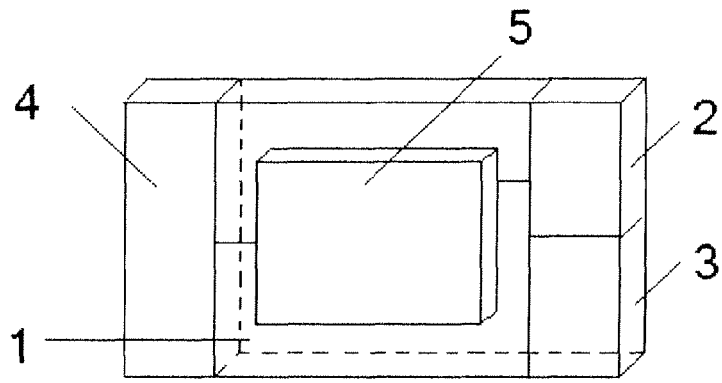
FIG. 1 is a schematic block diagram of a liquid crystal module detection apparatus for detecting image-sticking, according to an embodiment of the present invention.

As shown in FIG. 1, a liquid crystal module detection apparatus for detecting image-sticking, according to an embodiment of the present invention, comprises: a sealed thermal-insulating transparent container 1, a temperature-control module, and a signal generator module 4. The sealed thermal-insulating transparent container 1 is used to accommodate a liquid crystal module 5 to be tested, for example, the container is made of a good thermal-insulating, transparent material, the size of which may be customized based on the sizes of different liquid crystal modules to be tested so as to make full use of the heat emitted from the liquid crystal module itself; the temperature control module is used to adjust the temperature inside the container 1; and the signal generator module 4 is used to provide a drive signal to the liquid crystal module to be tested 5.

In the apparatus of this embodiment, the temperature control module may further comprise a temperature-control unit 2 and a temperature-adjustment unit 3. The temperature-control unit 2 is used to sense the temperature inside the container 1, and turn on/off the temperature-adjustment unit 3 according to the sensed temperature; the temperature-adjustment unit 3 is connected with the temperature-control unit 2, and is used, under the control of the temperature-control unit 2, to adjust the temperature inside the container 1, to avoid the case that the temperature inside the container 1 exceeds a temperature reference range for detection and evaluation due to excessive accumulation of heat.

In order to reduce the volume of the apparatus for easy carry and thus to facilitate real-time monitoring of image-sticking, for example, the temperature-control unit 2, the temperature-adjustment unit 3 and the signal generator module 4 may be wholly or partly integrated within the container 1.

In the apparatus of this embodiment, the temperature-control unit 2 may further comprise a temperature sensor and a controller. The temperature sensor is used to sense the temperature inside the container 1, and transmit the sensed temperature data to the controller; and the controller turns on/off the temperature-adjustment unit 3 according to the temperature data.

In the apparatus of this embodiment, for example, the signal generator module 4 may be a programmable logic controller (PLC) (but not limited thereto), which provides a drive signal to the liquid crystal module 5 to be tested.

Further, the controller may have its functions fulfilled by a programmable logic controller (PLC) (but not limited thereto), thus the controller controls to turn on/off the temperature-adjustment unit 3 according to the temperature data transmitted from the temperature sensor. Preferably, the controller may also have its functions fulfilled and controlled by the same one PLC, in order to further reduce the volume of the apparatus.

The temperature-adjustment unit 3 may be a valve or a heat exchange equipment or the like, which is connected with the temperature-control unit 2, as long as it can achieve the goal of expelling excessive heat from the inside of the container 1 to the outside, whereas its specific fulfillment forms here should not be construed as limitation on the present invention.

Another aspect of the present invention further provides a liquid crystal module detection and evaluation system for detecting image-sticking, and the system comprises a detection apparatus as described above.

Figure 2:
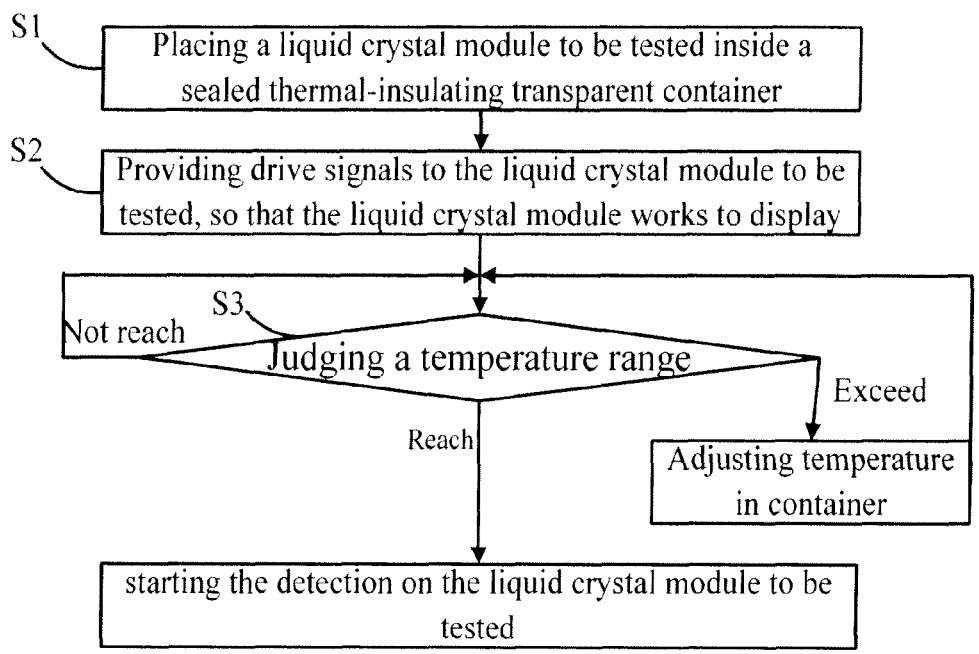
FIG. 2 is a flowchart illustrating a liquid crystal module detection and evaluation method for detecting image-sticking, according to an embodiment of the present invention.

As shown in FIG. 2, the liquid crystal module detection and evaluation method for detecting image-sticking, according to an embodiment of the present invention, may comprise steps as follows.

S1. A liquid crystal module to be tested is placed inside a sealed thermal-insulating transparent container.

S2. The signal generator module is turned on, to provide drive signals to the backlight source and the panel of liquid crystal module to be tested, so that the liquid crystal module to be tested works to display.

S3. The temperature inside the container is sensed in real time by the temperature-control module; if the sensed temperature does not reach a temperature reference range for detection, then waiting; if the sensed temperature exceeds the temperature reference range for detection, then the temperature inside the container is adjusted, until the sensed temperature is within the temperature reference range for detection, and then the detection of the liquid crystal module to be tested is started.

The above are merely exemplary implementations of the present invention, but not for limiting the scope of the invention; instead, the scope of the invention should be defined by the appended claims.

The invention claimed is:

1. A liquid crystal module detection apparatus for detecting image-sticking, comprising:
   a sealed thermal-insulating transparent container containing a liquid crystal module to be tested, wherein the liquid crystal module to be tested comprises a display panel and a backlight source;
   a temperature-control module for adjusting the temperature inside the container; and
   a signal generator module for providing a drive signal to the liquid crystal module to be tested;
   wherein the liquid crystal module to be tested for increasing a temperature within the container is entirely arranged within the container.

2. The liquid crystal module detection apparatus for detecting image-sticking according to claim 1, wherein the temperature-control module comprises: a temperature-control unit and a temperature-adjustment unit;
   the temperature-control unit is used to sense the temperature inside the container, and turn on/off the temperature-adjustment unit according to the sensed temperature; and
   the temperature-adjustment unit is connected with the temperature-control unit, and used to adjust the temperature inside the container.

3. The liquid crystal module detection apparatus for detecting image-sticking according to claim 2, wherein the temperature-control unit is integrated within the container.

4. The liquid crystal module detection apparatus for detecting image-sticking according to claim 2, wherein the temperature-adjustment unit is integrated within the container.

5. The liquid crystal module detection apparatus for detecting image-sticking according to claim 2, wherein the temperature-adjustment unit comprises a valve or a heat exchange equipment.

6. The liquid crystal module detection apparatus for detecting image-sticking according to claim 1, wherein the signal generator module is integrated within the container.

7. The liquid crystal module detection apparatus for detecting image-sticking according to claim 1, wherein the temperature-control unit comprises: a temperature sensor and a controller,
   wherein the temperature sensor is used to sense the temperature inside the container, and transmit the sensed temperature data to the controller; and
   the controller turns on/off the temperature-adjustment unit according to the temperature data.

8. The liquid crystal module detection apparatus for detecting image-sticking according to claim 7, wherein the signal generator module is a programmable logic controller.

9. The liquid crystal module detection apparatus for detecting image-sticking according to claim 8, wherein the controller and the signal generator module belong to same one programmable logic controller.

10. A liquid crystal module detection and evaluation system for detecting image-sticking, comprising an apparatus in accordance with claim 1.

11. The liquid crystal module detection apparatus for detecting image-sticking according to claim 1, wherein heat emitted from the panel and the backlight of the liquid crystal module are utilized to provide a desired temperature environment for detection.

12. A liquid crystal module detection and evaluation method for detecting image-sticking, comprising steps as follows:
   S1. placing a liquid crystal module to be tested inside a sealed thermal-insulating transparent container, wherein the liquid crystal module to be tested comprises a display panel and a backlight source;
   S2. providing drive signals to the liquid crystal module to be tested, so that the liquid crystal module to be tested works to display; and
   S3. sensing the temperature inside the container, and if the sensed temperature does not reach a temperature reference range for detection, then waiting; if the sensed temperature exceeds the temperature reference range for detection, then adjusting the temperature inside the container, until the sensed temperature is within the temperature reference range for detection, and then starting the detection on the liquid crystal module to be tested;
   wherein the liquid crystal module to be tested is configured for increasing a temperature within the container and is entirely arranged within the container.

13. The liquid crystal module detection and evaluation method for detecting image-sticking according to claim 12, wherein heat emitted from the panel and the backlight of the liquid crystal module are utilized to provide a desired temperature environment for detection.

14. A liquid crystal module detection apparatus for detecting image-sticking, comprising:
   a sealed thermal-insulating transparent container containing a liquid crystal module to be tested, wherein the liquid crystal module to be tested comprises a display panel and a backlight source;
   a temperature-control module for adjusting the temperature inside the container; and
   a signal generator module for providing a drive signal to the liquid crystal module to be tested;
   wherein the liquid crystal module to be tested for increasing a temperature within the container is entirely arranged within the container; and a bottom surface, a top surface and lateral surfaces of the liquid crystal module to be tested are within the container.

15. The liquid crystal module detection apparatus for detecting image-sticking according to claim 14, wherein the lateral surfaces of the liquid crystal module to be tested are spaced from the sealed thermal-insulating transparent container.

\* \* \* \* \*